United States Patent
Nevo et al.

(10) Patent No.: US 12,088,617 B1
(45) Date of Patent: Sep. 10, 2024

(54) NETWORK MONITOR WITH A HOMODYNE DETECTOR FOR EARLY IDENTIFICATION OF NETWORK ATTACKS

(71) Applicant: Cpacket Networks Inc., Milpitas, CA (US)

(72) Inventors: Ron Nevo, Portland, OR (US); Douglas Cooper, Lake Oswego, OR (US); Tzahi Grunzweig, San Jose, CA (US)

(73) Assignee: Cpacket Networks Inc., Milpitas, CA (US)

( * ) Notice: Subject to any disclaimer, the term of this patent is extended or adjusted under 35 U.S.C. 154(b) by 242 days.

(21) Appl. No.: 17/577,773

(22) Filed: Jan. 18, 2022

(51) Int. Cl.
*H04L 9/40* (2022.01)

(52) U.S. Cl.
CPC .................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 2008/0263671 A1 | 10/2008 | Solino Testa et al. | |
| 2009/0006841 A1* | 1/2009 | Ormazabal | H04L 63/1458 713/152 |
| 2016/0277357 A1 | 9/2016 | Kearney | |
| 2017/0374084 A1* | 12/2017 | Inoue | H04L 63/1433 |
| 2020/0380129 A1* | 12/2020 | Dawson | G06F 1/28 |
| 2023/0171268 A1* | 6/2023 | Marwah | H04L 63/1433 726/22 |

FOREIGN PATENT DOCUMENTS

| | | | | |
|---|---|---|---|---|
| CA | 2728303 A1 | * | 12/2009 | ........... G06F 17/509 |
| CN | 106788706 A | * | 5/2017 | ....... H04B 10/07955 |
| CN | 113206761 A | * | 8/2021 | ......... H04L 41/0631 |
| CN | 115314255 A | * | 11/2022 | |
| WO | WO-2021150379 A1 | | 7/2021 | |
| WO | WO-2023141422 A2 | * | 7/2023 | |

OTHER PUBLICATIONS

United States Patent and Trademark Office, International Search Report and Written Opinion for PCT/US2023/060744, Jun. 22, 2023, 12 pages.

* cited by examiner

*Primary Examiner* — Sarah Su
(74) *Attorney, Agent, or Firm* — Cooley LLP

(57) ABSTRACT

A system has a firewall ingress node carrying network traffic. An attack injector creates a network attack flow on the firewall ingress node and thereby forms with the network traffic a composite firewall input signal on the firewall ingress node. A firewall egress node carries a response signal corresponding to the composite firewall input signal. A network monitor is connected to the firewall ingress node and the firewall egress node. The network monitor includes a homodyne detector to multiply the response signal by an oscillating driver signal to form a product that is integrated over time to form a homodyne detector response signal that is larger when the homodyne detector response signal has some component with the same frequency as the oscillating driver signal.

7 Claims, 3 Drawing Sheets

NETWORK MONITOR WITH A HOMODYNE DETECTOR FOR EARLY IDENTIFICATION OF NETWORK ATTACKS

FIELD OF THE INVENTION

This invention relates generally to security in computer networks. More particularly, this invention is directed to a network monitor with a homodyne detector for early identification of network attacks.

BACKGROUND OF THE INVENTION

FIG. 1 illustrates a prior art system 100 including an external network 102 with at least one client machine 104. A firewall 106 separates the external network 102 from an internal network 108 with at least one server 110.

The client 104 submits incoming requests via the "External Incoming" port X1. In addition to legitimate requests from the client 104, sometimes network attacks are multiplexed on X1. Filtering legitimate requests from illegitimate requests is a purpose of the firewall 106. The filtered request are transmitted from the firewall 106 to the one of potentially many servers 110 in the internal part of the network 108 via port "Internal Incoming" X2. The response from the server 110 is first relayed via the "Internal Outgoing" port X3, and finally transmitted to the client(s) 104 by the firewall 106 via the "External Outgoing" port X4. The relationship between legitimate requests X1_Legit to response X4 is of great interest. For example, the network administrator needs to protect the network from a "Denial of Service Attack", which aims to introduce on X1 a large component of illegitimate requests, X1_attack, from an attacker aiming to bring the ratio X4/X1_legit to close to zero, by overwhelming the firewall 106 and internal network 108 with an excessive work load, which denies the client 104 from getting responses from the server 110. X4/X1_legit should have values between 1 (when all communications from X1_legit are answered) and 0 when no communications are answered. Note that this only has mathematical meaning when X1_legit is not zero (i.e., when there are legitimate communications requests).

It is therefore of great interest to know in real time the X4/X1_legit ratio. The disclosed solution addresses this problem.

SUMMARY OF THE INVENTION

A system has a firewall ingress node carrying network traffic. An attack injector creates a network attack flow on the firewall ingress node and thereby forms with the network traffic a composite firewall input signal on the firewall ingress node. A firewall egress node carries a response signal corresponding to the composite firewall input signal. A network monitor is connected to the firewall ingress node and the firewall egress node. The network monitor includes a homodyne detector to multiply the response signal by an oscillating driver signal to form a product that is integrated over time to form a homodyne detector response signal that is larger when the homodyne detector response signal has some component with the same frequency as the oscillating driver signal.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
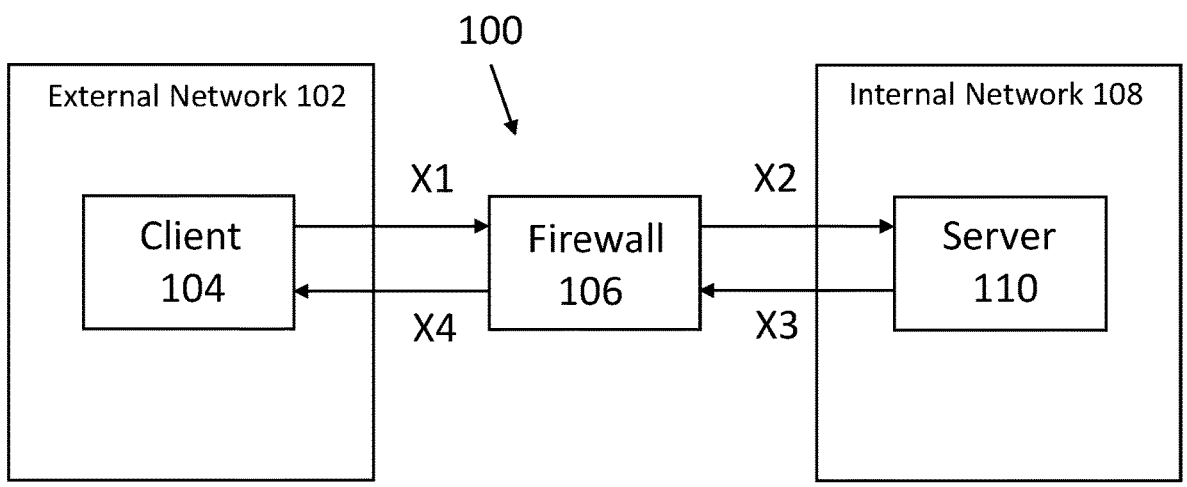
FIG. 1 illustrates a prior art computer network.
Figure 2:
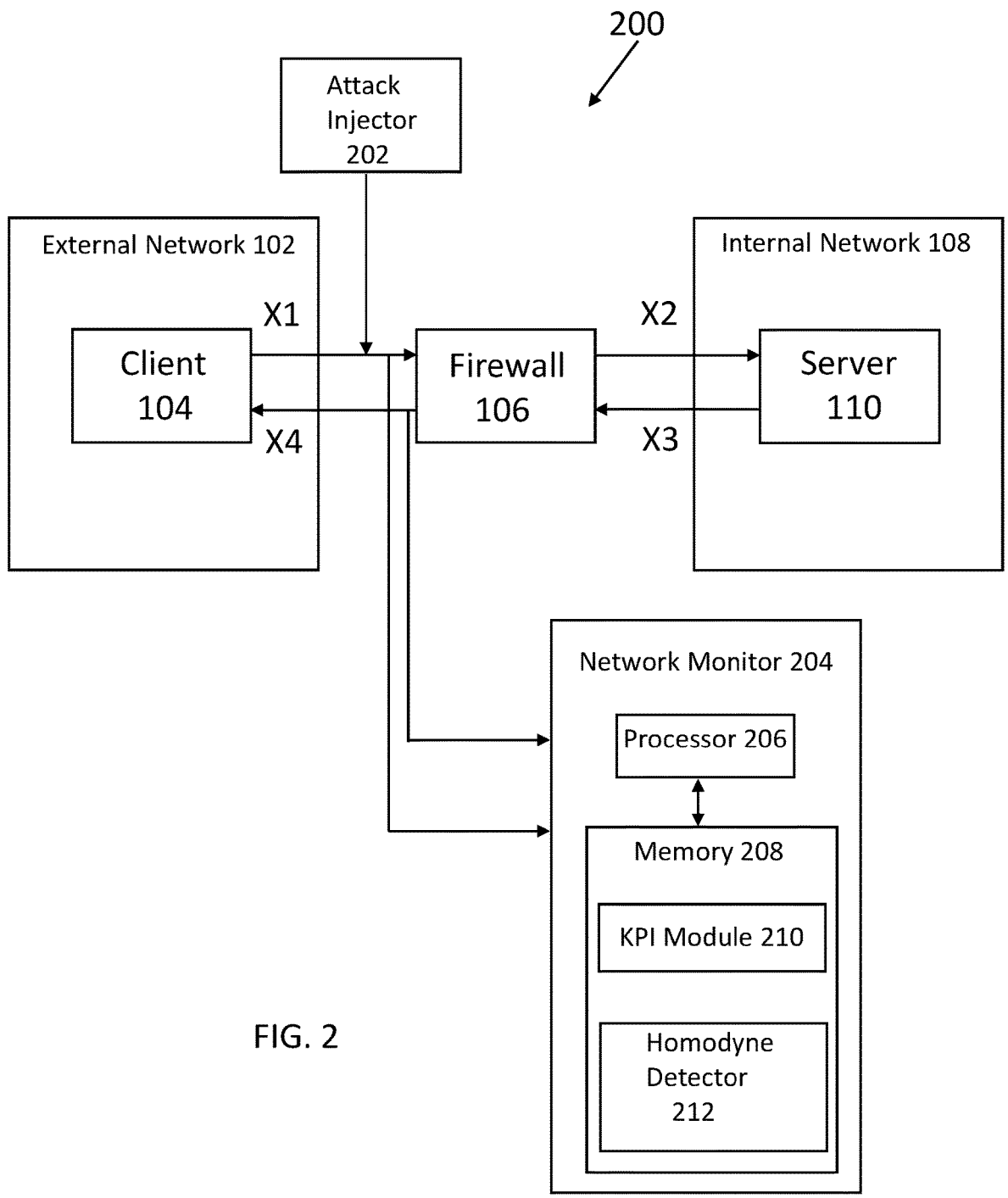
FIG. 2 illustrates a computer network configured in accordance with an embodiment of the invention.

FIG. 2 illustrates a network 200 configured in accordance with an embodiment of the invention. The network 200 includes the components of FIG. 1. In addition, the network 200 includes an attack injector 202 and a network monitor 204. As shown in FIG. 2, the network monitor 204 includes connections to ports X1 and X4. The network monitor 204 monitors these ports up to line speed. The network monitor 204 includes a processor 206 connected to a memory 208. The memory 208 stores instructions executed by the processor 206 to implement operations disclosed herein. The instructions include a Key Performance Indicator (KPI) module 210 to supply important network performance measures with high resolution. The memory 208 also stores a homodyne detector 212 with instructions executed by processor 206 to compute a B(t) integral of line data quickly (i.e., fast enough for timely mitigation, but not necessarily in real time, but faster than attack ramp up speed) and store the output for further analysis. The homodyne detector 212 may also be implemented using a Field Programmable Gate Array.

The disclosed system 200 provides insights into the performance of the firewall 106 during network attacks. In particular, the system 200 characterizes the sensitivity of X1_legit/X4 to the strength of an attack (X1_attack):

$$X4/X1\_legit=f(X1\_attack)$$

The system 200 also provides information on latency, which measures the time since the client communicated a request "i" to when the network communicated the server reply to request "i":

$$dt=X4.i.\text{time}-X1\_legit.i.\text{time}$$

Note that this is total latency, which has a server component. More complex timing systems can measure server component latency (by utilizing X2 and X3 signals). X4.i.time means time of event (i) on channel X4, and similarly X1_legit.i.time means time of legitimate event (i) on channel X1, such that these two events correspond to a specific "conversation", sometimes referred to as a "flow" of communication between client 104 and server 110. For some protocols, correlating the X1_legit.i.time packets with the X4.i.time packets is simple. For other protocols, this correlation requires extra work. For instance, one may need to introduce some packets on X1 for timing purposes, e.g., X1_timing.i. These can be considered as part of X1_legitimate.

Knowing this allows one to provide early warning, as to the capability of the firewall 106 to withstand future attacks and allows for the organization to make mitigating steps to increase its readiness to perceived threats.

The following discussion will be aided by defining two fundamental properties of an attack: "Strength" and "Frequency". The strength describes the load which is generated on the client system as a result of a single event. The strength of an event can be adjusted in one or more of several ways. Some examples:

1. Using a natively stronger client request. For example, the load created by a "ping" request is weaker than the load created by a "SYN" request.
2. Using a Pulse Density Modulation of the client requests. In that case we talk about "effective strength", which is a strength averaged over a short time window T. We can modulate the effective strength by changing how many requesting packets are transmitted in different time windows.
3. Using software installed on the server that creates an adjustable load on the server when a packet arrives. In this case the packet itself does not create a significant load when received, but the installed software can create an adjustable load upon receiving the packet.
4. We can also simulate the entire attack on the server via installed software. In this case the server load is adjusted by the installed software in controlled way.

The "frequency" attribute describes the amount of attacking event per unit time. The frequency can be changed trivially by increasing or decreasing the time between attacking packets. For example, some attacks would have the attack event be the delivery of a single packet. Then the strength of the attack is the amount of work created by the server to respond to a single attacking packet. Likewise, the frequency of the attack is the frequency of the attacking packets.

We can also define the "impact" of the attack, as the total load incurred on the victim system by an attack described by strength and frequency attributes over a length of time.

What is considered a strong and/or frequent attack depends on the ability of the defending system to handle the load. The mitigation described here would initially start with a training step to learn a set of parameters that describe the network performance under load. The next step is a deployment step where the learned parameters are used to monitor the network behavior when deployed. Consider the following use case:

1. The network monitor 204 is used to record nominal incoming traffic and measure nominal response.
2. The attack injector 202 creates an attack flow, i.e. a set of packets that imitate an attack. An example of such an attack flow is the "Canadian Institute of Cybersecurity" CIC-2019 data set. Thus, the attack injector 202 may be implemented as a computer supplying CIC-2019 data to node X1. As in the CIC-2019 data set, several different attacks types with varying attack strengths, are to be encapsulated in the attack flow.
3. A synthetic signal is formed from the multiplexing of (1) and (2), into the X1 port.
4. The attack signal's (2) frequency and strength are controlled and are adjusted.
5. The network monitor 204 computes measures of the impact of the attack, for example:
   a. The ratio of packets per unit time, X4/X1_legit.
   b. The latency between X4 and X1.
6. The sequence 4-5 can be performed at some time when a stress test can be performed to find the limits of the system (in terms of attack strength, frequency and impact). For example, the ratio of packets per unit time, X1/X1_legit that impedes performance (for example, causes legitimate messages X_legit to be ignored in X4 or increases latency) can be established.
7. Once the thresholds and parameters in (6) are identified, they can be used to deal with real world situations. In the real world there is not predetermined knowledge of the content of information on X1; therefore, some analysis is required to determine if a communication on X1 is legitimate or an attack. One simple solution is to rely on the firewall 106 filtering methods: estimate from X1 the X1_legit by measuring also X2. X2 is the part of X1 which the firewall 106 considers legit. X1/X2 can be an estimator to X1/X1_legit and a warning can be set to alarm the network administrator as this value increases towards the system limit ascertained ahead of time in step 6. Although not shown in FIG. 2, this technique requires an additional connection between the network monitor 204 and node X2.

This embodiment suffers from the drawback that the stress test may require down time for the network. To avoid this drawback, an embodiment of the invention uses a homodyne detector 212. Homodyne measurement includes a generator that creates a perturbative drive on a system, and a detector that measures the system's response of the perturbation. Homodyne detection amplifies a periodic signal (such as a sinusoidal signal) that is at, or close to, the driving perturbative drive's frequency. In the context of this embodiment, the attack injector is a "homodyne generator", and the network monitor is a "homodyne detector", both configured to measure around a frequency of interest. The disclosed technique amplifies the X4_response using the homodyne measurement method, such that attacks are detectable even for X1_attack that is weak, or an attack that has a low frequency or an attack that has generally low impact.

The homodyne detector 212 is a "lock-in amplifier" approach to measuring the sensitivity of the network performance to attack. The use of the term lock-in amplifier or lock-in amplification aims to illustrate the homodyne detection scheme, which uses a measurement principle realized in a device. This scheme can be realized, for example, by the literal lock-in-amplifier device, or by electronic circuitry within a network monitor 204. A lock-in amplifier extracts a signal with a known carrier wave from a noisy environment.

This embodiment includes the following operations:
1. The nominal incoming traffic and nominal response are measured using the network monitor 204.
2. An attack is injected using the attack injector 202.
3. Signals (1) and (2) are combined to create a synthetic signal.
4. The impact of signal (2) relative to signal (1) is controlled for both strength and frequency:
   a. First, for strength, signal (2) can be made such that it incurs a desired load on the server, for example by running dedicated software on the server that loads to an adjustable degree when a packet associated with signal 2 is ingested. This load can be set to change as a sinusoidal function over time. Signal (2) can be referred to as a "probe signal".
   b. Second, the frequency is inversely related to the time interval between packets belonging to signal (2) and can be set to any frequency of interest.
   c. The resulting attack strength over time A(t) is then given by:

$$A(t) = A_0 * \sin(2\pi f t)$$

with A0 chosen such that it is the peak attack strength during a single attack cycle, sin is the sine function, $\pi$ is the pi-constant, f is the frequency in which the attack strength is modulated over time, t is the time.

5. The network monitor 204 measures:
   a. The ratio X4/X1_legit (X1_legit>0).
   b. The latency of X4 to the injected part of X1.

The signal on X4 is further analyzed via the lock-in amplification method in the homodyne detector 212. That is, we use a homodyne detector to look at the evolution in time of signal X4, denoted below as $X_4(t)$, specifically the response to the modulation signal A(t) is given by:

$$B(\tau)=\int_{\tau}^{\tau+T}X_4(t)*\sin(2\pi ft+\theta)dt$$

Here, $B(\tau)$ is the response function, at time $\tau$. t is the integration parameter, T is the integration window, chosen to be a large number of perturbation driver cycles: $T>>1/f$. $\theta$ is an additional phase term that is needed in order to match the phase shift due to the latency of $X_4(t)$ relative to A(t). Note that once B is thus defined, we can use the term B(t) instead of $B(\tau)$ henceforth.

Figure 3:
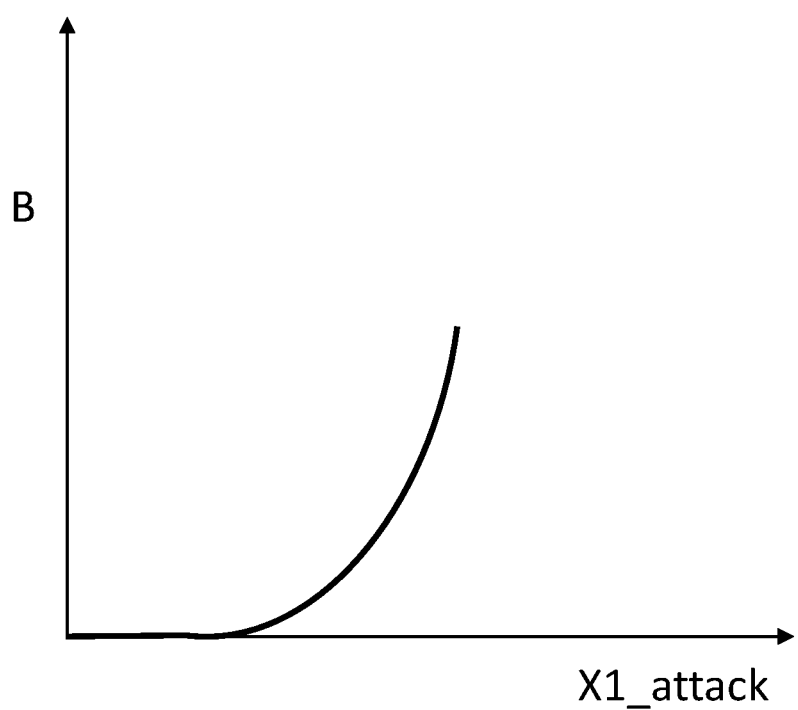
FIG. 3 illustrates a response (B) as a function of attack strength for a given modulation strength A0 achieved in accordance with an embodiment of the invention.

6. The Latency can be measured by injecting another signal to the probe, that is legitimate, and $\theta$ can be calculated from it. For example, the attack injector 202 may inject a signal X1.*i* and the latency of the matching X4.*i* response is measured.
7. Observe that the measurement of B(t) is happening continuously while the network is operating normally. A weak attack signal (small A0) is constantly injected. The attack signal is small enough to not degrade network performance by itself. The following is the expected behavior shown in FIG. 3 is expected:
   a. When no external attack is happening via X1, and no injected attack (A0=0), then B(t) is zero or close to zero.
   b. When no external attack is happening, and the injected attack peak strength (A0) is small, and within the performance envelope of the firewall 106, then B(t) is close to zero.
   c. When there is an attack via X1, with frequency close to f, and we also inject on X1 our weak perturbation driver A(t), then B(t) increases. Notably B(t) is non-zero even if both these attacks (the real one, and our injected one) are still weak enough to be within the performance envelope for the firewall 106.
   d. B(t) is monitored in real time to provide early warning that an attack is ramping up, and to provide real time warning when the attack reaches a threshold value that requires network administrator attention and mitigation.
8. The frequency of interest, f, may not always be known. In this case, we can repeat the exercise above, wherein each repetition we use a different frequency f, which is sampled from a range of frequencies.

Embodiments of this invention include only the client and the server (with no firewall). The case of no firewall can be thought of as a case where a firewall does not interfere with incoming and outgoing traffic at all, i.e., where X2=X1 and X4=X3. In general, this invention applies to a system that has incoming and an outgoing ports, and that the performance on the outgoing ports can be effected by the load in the incoming port (which can be benign or malicious). We note further that one, or more, of the ports can be virtual, in the sense that is simulated by the client machine.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a firewall ingress node carrying network traffic;
   an attack injector to create a network attack flow on the firewall ingress node and thereby form with the network traffic a composite firewall network traffic input signal on the firewall ingress node;
   a firewall egress node carrying a network traffic response signal corresponding to the composite firewall network traffic input signal; and
   a network monitor connected to the firewall ingress node and the firewall egress node, the network monitor including a homodyne detector to multiply the network traffic response signal by an oscillating driver signal to form a product that is integrated over time to form a homodyne detector network traffic response signal that is larger when the homodyne detector network traffic response signal has some component with the same frequency as the oscillating driver signal thereby indicating a network attack.

2. The system of claim 1 wherein the oscillating driver signal corresponds to the network attack flow.

3. The system of claim 1 wherein the network attack flow is a pre-existing file of packets that imitate a network attack.

4. The system of claim 1 wherein the network monitor analyzes the volume of traffic on the firewall ingress node to the volume of traffic passed by the firewall to form a measure of legitimate network traffic.

5. A machine, comprising:
   an ingress node carrying network traffic;
   an attack injector to create a network attack flow associated with the network traffic and thereby form a composite network traffic input signal; and
   a homodyne detector to multiply the composite network traffic input signal by an oscillating driver signal to form a product that is integrated over time to form a homodyne detector network traffic response signal that is larger when the homodyne detector response signal has some component with the same frequency as the oscillating driver signal thereby indicating a network attack.

6. The machine of claim 5 wherein the oscillating driver signal corresponds to the network attack flow.

7. The machine of claim 5 wherein the network attack flow is a pre-existing file of packets that imitate a network attack.

\* \* \* \* \*